(12) United States Patent
Biran

(10) Patent No.: US 6,661,554 B2
(45) Date of Patent: Dec. 9, 2003

(54) BIASING OF AN ELECTRO-OPTICAL COMPONENT

(75) Inventor: Yonatan Biran, Timrat (IL)

(73) Assignee: Cyoptics (Israel) Ltd., Yokneam Illit (IL)

( * ) Notice: Subject to any disclaimer, the term of this patent is extended or adjusted under 35 U.S.C. 154(b) by 0 days.

(21) Appl. No.: 10/156,668

(22) Filed: May 23, 2002

(65) Prior Publication Data

US 2003/0039017 A1 Feb. 27, 2003

Related U.S. Application Data

(60) Provisional application No. 60/314,321, filed on Aug. 23, 2001.

(51) Int. Cl.$^7$ .............................. G02F 1/01; G02B 6/36
(52) U.S. Cl. ..................... 359/239; 359/245; 385/14; 385/88; 385/89; 385/92; 385/94
(58) Field of Search ................................ 359/239, 245; 385/14, 88, 89, 92, 94

(56) References Cited

U.S. PATENT DOCUMENTS 6,293,711 B1 * 9/2001 Sasaki .................... 385/88

* cited by examiner

*Primary Examiner*—Hung Xuan Dang
*Assistant Examiner*—Tuyen Tra
(74) *Attorney, Agent, or Firm*—Darby & Darby

(57) ABSTRACT

An electro-optical assembly, consisting of an optical sub-assembly and a transmission line. The optical sub-assembly consists of an electro-optical component having an optical region and a first and a second electrode coupled thereto, and a conductive optical bench in contact with the second electrode of the electro-optical component, the optical bench being adapted to permit optical alignment of the electro-optical component while making such contact. The transmission line consists of a live conductor, a ground conductor insulated from the live conductor, and a port adapted to receive a signal. The live and ground conductors are coupled to the first and second electrodes of the electro-optical component so as to convey the signal between the port and the electro-optical component and to provide a direct current (DC) bias level to the electro-optical component independent of the signal.

38 Claims, 2 Drawing Sheets

BIASING OF AN ELECTRO-OPTICAL COMPONENT

CROSS-REFERENCE TO RELATED APPLICATION

This application claims the benefit of U.S. Provisional Patent Application No. 60/314,321, filed Aug. 23, 2001, which is assigned to the assignee of the present invention and which is incorporated herein by reference.

FIELD OF THE INVENTION

The present invention relates generally to electro-optical components, and specifically to electrical biasing of the components.

BACKGROUND OF THE INVENTION

In order for an electro-optical component, such as an Electro-Absorption Modulator (EAM) or a photo-diode detector (PDD), to function correctly, the element typically requires the ability to be independently DC biased and AC modulated. In addition to these electrical requirements, the element usually also needs to be aligned optically.

FIG. 1 illustrates apparatus, known in the art, for electrically and optically coupling an electro-optical component 10. Component 10 is mounted on a first capacitor 24, which typically has a capacitance of the order of 1 nF, so that a lower electrode 17 of the component mates with a first electrode 19 of the capacitor. Capacitor 24 is in turn mounted on a conductive optical bench 26, so that a second electrode 11 of the capacitor is in electrical contact with the optical bench. A second capacitor 28, typically having a capacitance of the order of 1 $\mu$F, is coupled in parallel with capacitor 24, the two capacitors forming a low impedance path for low and high AC frequencies between the optical bench and the optical element. Optical bench 26 is electrically connected to a ground conductor 12 of a transmission strip-line 16. A second conductor 14 of the transmission strip-line is bonded, by a wire 18, to an upper electrode 22 of component 10. Typically, a resistor 21 may be connected between electrode 22 and ground 12. The resistor serves as an impedance match and as a DC return.

Electro-optical component 10 is aligned with an optical element 20, such as a fiber optic, by adjusting optical element 20. When alignment is achieved, optical element 20 is mechanically coupled to the optical bench.

The arrangement of elements as shown in FIG. 1 provides DC isolation of electro-optical component 10 from ground conductor 12, while enabling the component to be modulated by an AC voltage via capacitors 24 and 28. Thus, electro-optical component 10 may be DC biased independent of any AC modulation provided to the element, by applying a DC bias level to electrode 17 and applying a ground potential to electrode 22 via resistor 21. However, this method of arranging elements in order to be able to DC bias electro-optical component 10 separates the component from optical bench 26, causing severe difficulties in aligning the component. An improved arrangement for aligning an electro-optical component is thus required.

SUMMARY OF THE INVENTION

It is an object of some aspects of the present invention to provide a method and apparatus for biasing and optically aligning an electro-optical component.

In preferred embodiments of the present invention, an electro-optical assembly comprises a transmission line which is coupled to an electro-optical component. The electro-optical component comprises a first and a second electrode coupled to an optical region, the optical region being aligned optically. The transmission line, preferably a micro-strip line, comprises a "live" conductor and a ground conductor, the ground conductor being divided into a first ground section and a second ground section by a non-conducting gap formed in the second conductor, so that the two ground sections are mutually isolated from a direct current (DC) point of view. The two ground sections are connected by one or more capacitors which effectively short-circuit the two sections from an alternating current (AC) point of view. The second ground section is bonded to a conductive optical bench, upon which the electro-optical component is positioned directly, the first electrode of the component being bonded to the optical bench. The second electrode of the electro-optical component is electrically connected to the live conductor of the micro-strip.

The assembly thus enables the electro-optical component to be DC biased independently of an AC level which feeds the component. Furthermore, since the electro-optical component mates directly with the optical bench, optical alignment of the component is significantly easier than electro-optical assemblies wherein the component is not in direct contact with the optical bench.

In some preferred embodiments of the present invention, the assembly is implemented as two sub-assemblies. A first sub-assembly comprises the transmission line implemented as described above and coupled with the one or more capacitors. A second sub-assembly comprises the electro-optical component mated with the optical bench. Preferably, the second sub-assembly is used to optically align the electro-optical component, and then the first sub-assembly is coupled to the second sub-assembly, to form the complete electro-optical assembly.

There is therefore provided, according to a preferred embodiment of the present invention, an electro-optical assembly, including:

an optical sub-assembly, including:
  an electro-optical component including an optical region and a first and a second electrode coupled thereto; and
  a conductive optical bench in contact with the second electrode of the electro-optical component, the optical bench being adapted to permit optical alignment of the electro-optical component while making such contact; and a transmission line including:
  a live conductor;
  a ground conductor insulated from the live conductor; and
  a port adapted to receive a signal, such that the live and ground conductors are coupled to the first and second electrodes of the electro-optical component so as to convey the signal between the port and the electro-optical component and to provide a direct current (DC) bias level to the electro-optical component independent of the signal.

Preferably, the conductive optical bench is in direct mechanical and electrical contact with the second electrode.

Preferably, the transmission line includes a micro-strip line which is adapted to operate at frequencies up to approximately 50 GHz.

Preferably, the ground conductor includes a first ground section and a second ground section separated from the first ground section by an insulating gap, wherein the first and second ground sections are coupled together capacitively, and wherein the first ground section is connected to the conductive optical bench.

Further preferably, the first and second ground sections are coupled by at least one capacitor so as to form an effective short-circuit between the two sections at alternating current (AC) frequencies in a range from approximately 1 kHz to approximately 50 GHz.

Further preferably, the transmission line and the at least one capacitor are fabricated as an electrical sub-assembly, and the electro-optical assembly is fabricated by coupling the electrical sub-assembly to the optical sub-assembly.

Preferably, the optical bench is adapted to permit the optical alignment after the live and ground conductors of the transmission line are coupled to the first and second electrodes of the electro-optical component.

Preferably, the assembly includes circuitry which matches an impedance of the electro-optical component to the impedance of the transmission line.

Further preferably, the circuitry includes a resistor connected between the first electrode and the ground conductor.

Alternatively or additionally, the circuitry includes a resistor and a capacitor connected in series between the first electrode and the conductive optical bench.

There is further provided, according to a preferred embodiment of the present invention, an electro-optical assembly, including:

an electro-optical component including an optical region and a first and a second electrode coupled thereto;

a conductive optical bench, in contact with the second electrode of the electro-optical component, the bench being adapted to permit optical alignment of the electro-optical component while making such contact;

a transmission line including a live conductor and a ground conductor insulated from the live conductor, the live conductor being bonded to the first electrode of the electro-optical element, the ground conductor including a first ground section and a second ground section electrically connected to the optical bench and insulated from the first ground section by a non-conductive gap therebetween, the second ground section being capacitively coupled to the first ground section.

Preferably, the conductive optical bench is in direct mechanical and electrical contact with the second electrode.

Preferably, the transmission line includes a micro-strip line which is adapted to operate at frequencies up to approximately 50 GHz.

Preferably, the first and second ground sections are coupled by at least one capacitor so as to form an effective short-circuit between the two sections at alternating current (AC) frequencies in a range from approximately 1 kHz to approximately 50 GHz.

Preferably, the optical bench is adapted to permit the optical alignment after the live and ground conductors of the transmission line are coupled to the first and second electrodes of the electro-optical component.

Preferably, the assembly includes circuitry which matches an impedance of the electro-optical component to the impedance of the transmission line.

Further preferably, the circuitry includes a resistor connected between the first electrode and the first ground section.

Alternatively or additionally, the circuitry includes a resistor and a capacitor connected in series between the first electrode and the conductive optical bench.

There is further provided, according to a preferred embodiment of the present invention, a method for operating an electro-optical assembly, including:

positioning an electro-optical component including an optical region and a first and a second electrode coupled thereto, so that the second electrode contacts a conductive optical bench;

aligning the electro-optical component while maintaining the contact; and coupling a transmission line, including a live conductor and a ground conductor insulated from the live conductor and a port adapted to receive a signal, to the electro-optical component, such that the live and ground conductors are coupled to the first and second electrodes of the electro-optical component, the transmission line being adapted to convey the signal between the port and the electro-optical component and to enable a direct current (DC) bias level to be applied to the electro-optical component independent of the signal.

Preferably, positioning the electro-optical component includes placing the component in direct mechanical and electrical contact with the second electrode.

Preferably, the transmission line includes a micro-strip line which is adapted to operate at frequencies up to approximately 50 GHz.

Preferably, the ground conductor includes a first ground section and a second ground section separated from the first ground section by an insulating gap, and wherein coupling the transmission line includes coupling the first and second ground sections capacitively and connecting the first ground section to the conductive optical bench.

Further preferably, coupling the first and second ground sections capacitively includes coupling the first and second ground sections by at least one capacitor so as to form an effective short-circuit between the two sections at alternating current (AC) frequencies in a range from approximately 1 kHz to approximately 50 GHz.

Preferably, the method includes:

fabricating the transmission line and the at least one capacitor as an electrical sub-assembly;

fabricating the electro-optical component and the conductive optical bench as an optical sub-assembly; and coupling the electrical sub-assembly to the optical sub-assembly to form the electro-optical assembly.

Preferably, aligning the electro-optical component includes performing an alignment after coupling the transmission line.

Preferably, aligning the electro-optical component includes adjusting an optical element to be in alignment with the electro-optical component and mechanically coupling the optical element to the conductive optical bench after performing the adjustment.

Preferably, the method includes matching an impedance of the electro-optical component to the impedance of the transmission line.

Further preferably, matching the impedance includes connecting a resistor between the first electrode and the ground conductor.

Alternatively or additionally, matching the impedance includes connecting a resistor and a capacitor in series between the first electrode and the conductive optical bench.

There is further provided, according to a preferred embodiment of the present invention, a method for operating an electro-optical assembly, including:

positioning an electro-optical component, having an optical region and a first and a second electrode coupled thereto, on a conductive optical bench so that the second electrode contacts the bench;

aligning the electro-optical component while the second electrode is in contact with the bench;

bonding a live conductor of a transmission line to the first electrode of the electro-optical component;

providing a first ground section of the transmission line for connection to a ground; and connecting a second ground section of the transmission line, which is separated by a non-conductive gap from the first ground section and is capacitively coupled to the first ground section, to the optical bench.

Preferably, positioning the electro-optical component includes placing the conductive optical bench in direct mechanical and electrical contact with the second electrode.

Preferably, the transmission line includes a micro-strip line which is adapted to operate at frequencies up to approximately 50 GHz.

Preferably, the method includes coupling the first and second ground sections by at least one capacitor so as to form an effective short-circuit between the two sections at alternating current (AC) frequencies in a range from approximately 1 kHz to approximately 50 GHz.

Preferably, aligning the electro-optical component includes performing an alignment after bonding the live conductor of the transmission line and connecting the second ground section of the transmission line.

Preferably, aligning the electro-optical component includes adjusting an optical element to be in alignment with the electro-optical component and mechanically coupling the optical element to the conductive optical bench after performing the adjustment.

Preferably, the method includes matching an impedance of the electro-optical component to the impedance of the transmission line.

Further preferably, matching the impedance includes connecting a resistor between the first electrode and the first ground section.

Alternatively or additionally, matching the impedance includes connecting a resistor and a capacitor in series between the first electrode and the conductive optical bench.

The present invention will be more fully understood from the following detailed description of the preferred embodiments thereof, taken together with the drawings, in which:

DETAILED DESCRIPTION OF PREFERRED EMBODIMENTS

Figure 2:
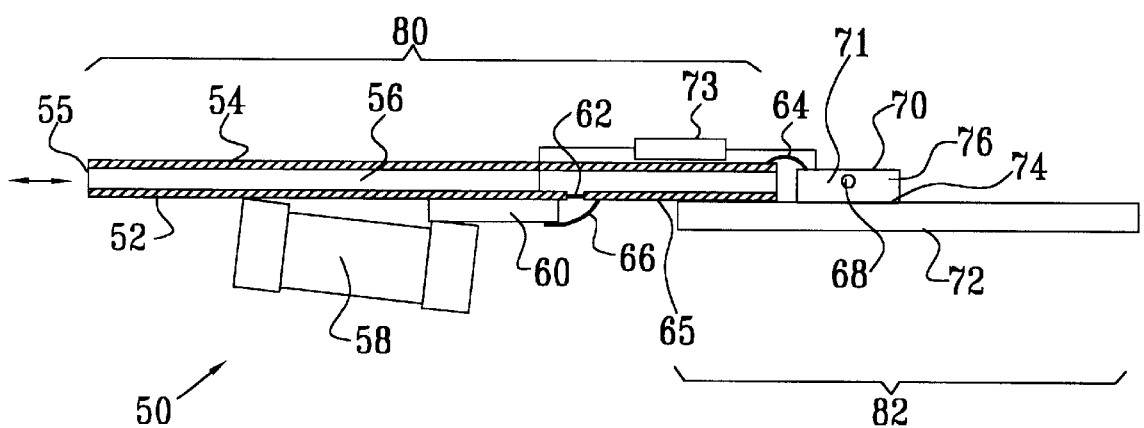
FIG. 2 is a schematic diagram of an assembly for biasing an electro-optical component, according to a preferred embodiment of the present invention.

Reference is now made to FIG. 2, which is a schematic diagram of an assembly 50 for biasing an electro-optical component, according to a preferred embodiment of the present invention. A transmission line 56 feeds an electro-optical component 76. Component 76 comprises an upper electrode 70 and a lower electrode 74. Component 76 also comprises an optical region 71, coupled to the electrodes, which, in order to function correctly, requires optical alignment. Component 76 is typically an electro-absorption modulator (EAM) or a photo-diode detector (PDD). However, it will be understood that electro-optical component 76 comprises substantially any component having two electrodes and which acts as a transducer converting between electrical energy and optical radiation energy, or which utilizes electrical energy to change an optical characteristic of the component, such as a change of a refractive index of the component. Component 76 requires alignment with an optical element 68, herein assumed by way of example to comprise a fiber optic. Assembly 50 is preferably implemented to operate at frequencies in a range from approximately 1 kHz to approximately 50 GHz, although it will be understood that preferred embodiments of the present invention may operate at frequencies different from this frequency range.

Transmission line 56, most preferably a micro-strip transmission line, comprises an upper "live" conductor 54 and lower ground conductors 52 and 65, and is preferably implemented from specialized material, such as double-sided 10 mil alumina substrate, although any other material known in the art for implementing transmission lines at a frequency of operation of component 76 may be used to implement line 56. In the specification and in the claims, the terms micro-strip transmission line and micro-strip line are assumed to refer to a transmission line having a first conductor and a second conductor, one of the conductors acting as a substantially infinite ground plane, the two conductors not lying in the same plane. A non-conductive gap 62 is formed on the lower surface of line 56, thus breaking the ground conductor of the micro-strip into ground sections 52 and 65. Ground sections 52 and 65 act as a ground plane. Preferably, electrical signals to line 56 are input to a port 55 of the line, and the line then conveys the signals to component 76. Alternatively or additionally, port 55 acts as an output port, outputting signals received from component 76 via line 56.

A first electrode of a first capacitor 60, which has a capacitance of the order of 1 nF, is bonded to section 52. Capacitor 60 is typically disk-shaped. A second capacitor 58, typically a surface mounted component having a capacitance of the order of 1 μF, is connected in parallel with the first capacitor. The parallel capacitors act as a capacitor providing a broad-band short-circuit at AC frequencies in a range from approximately 1 kHz to approximately 50 GHz. A conductor 66, typically a gold wire or ribbon, is bonded to a second electrode of capacitor 60 (and of capacitor 58) and to section 65. Thus, ground section 65 is effectively AC coupled to ground section 52, but is DC insulated from ground section 52, and so "floats" with reference to section 52.

Ground section 65 is bonded to a conductive optical bench 72, upon which is mounted electro-optical component 76. Lower electrode 74 of component 76 mates with bench 72, and is bonded to the bench. Upper electrode 70 of component 76 is connected to upper conductor 54 of line 56. The connection between electrode 70 and conductor 54 is implemented by bonding a conductor 64, preferably a gold wire or ribbon, between the electrode and the conductor. A resistor 73 is most preferably connected between ground section 52 and electrode 70, the resistor acting as an impedance match and as a DC path to ground. Alternatively, for example, where there is a DC component on conductor 54 such as is generated from an Electro-Absorption Modulator (EAM) driver, resistor 73 is kept floating. Such a system is described in more detail below with respect to FIG. 3.

Element 68 and component 76 need to be aligned to extremely close tolerances, of the order of 0.2 μm, in order for assembly 50 to function efficiently. Furthermore, the alignment needs to be maintained during operation of assembly 50, when ambient parameters such as temperature may vary significantly. To accomplish these aims, bench 72 is manufactured to sufficiently close tolerances so that component 76, when mounted directly on the bench as described above, is approximately optically aligned with element 68. More exact alignment of element 68 with component 76 may then be performed by positioning element 68, and by mechanically coupling element 68 to the bench when alignment is achieved.

It will be appreciated that initial approximate alignment of component 76, subsequent exact alignment of the component, and maintenance of the alignment during operation of assembly 50, are all facilitated by mounting the component directly on bench 72, so that the component and the element aligned with the component are close to the bench. Because of the direct connection between component 76 and optical bench 72, ambient parameter changes, such as ambient temperature changes, have substantially no effect on the alignment of component 76.

Figure 1:
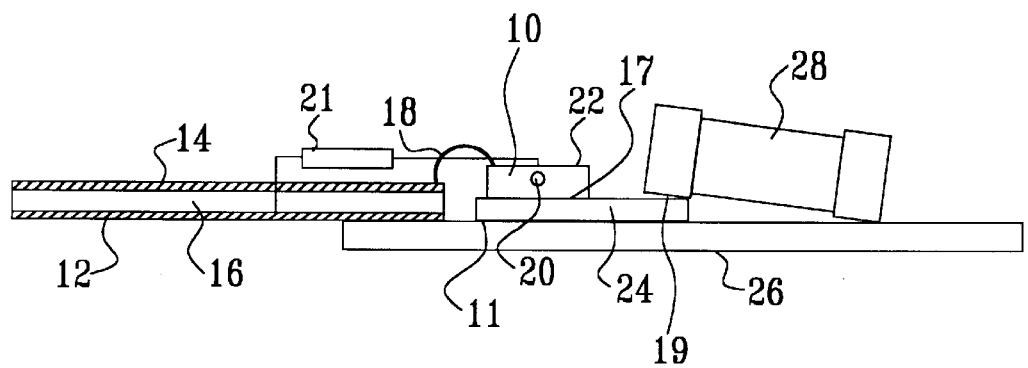
FIG. 1 illustrates apparatus, as is known in the art, for electrically and optically coupling an electro-optical component.

(In the system described with reference to FIG. 1, where electro-optical component 10 is mounted on capacitor 24, initial and subsequent alignment of component 10 are difficult because of the distance of the component from bench 26. Furthermore, any ambient parameter changes during operation of the system of FIG. 1 significantly affect the alignment by causing movement or expansion or contraction of capacitor 24.)

In some preferred embodiments of the present invention, assembly 50 is implemented as two separate sub-assemblies 80 and 82. First sub-assembly 80 comprises transmission line 56, capacitors 58 and 60, resistor 73, and conductor 66. The elements of sub-assembly 80 are coupled together substantially as described above. Second sub-assembly 82 comprises electro-optical component 76 mounted and bonded, as described above, to optical bench 72. Typically, sub-assembly 82 is mounted in a receiving package for assembly 50, and exact alignment of element 68 with electro-optical component 76 is performed substantially as described above. Sub-assembly 80 is then coupled to sub-assembly 82 by bonding ground section 65 to the optical bench, and by bonding conductor 64 to conductor 54 and electrode 70 of electro-optical component 76.

It will be appreciated that the arrangement of assembly 50 isolates electrode 74 from ground section 52 from a DC point of view, while the electrode is coupled to the ground section from an AC point of view. Thus, component 76 may be DC biased by applying DC levels to electrodes 70 and 74 independent of any AC transmission injected into transmission line 56. Ground section 52 is unaffected by the application of DC to electrode 74, since the latter is DC insulated from the ground section by gap 62. Furthermore, since electro-optical component 76 mates directly with optical bench 72, alignment of the optical bench effectively approximately pre-aligns the component, and exact alignment with optical element 68 by subsequent adjustment of the bench is straightforward, unlike the prior art assembly described with reference to FIG. 1.

Figure 3:
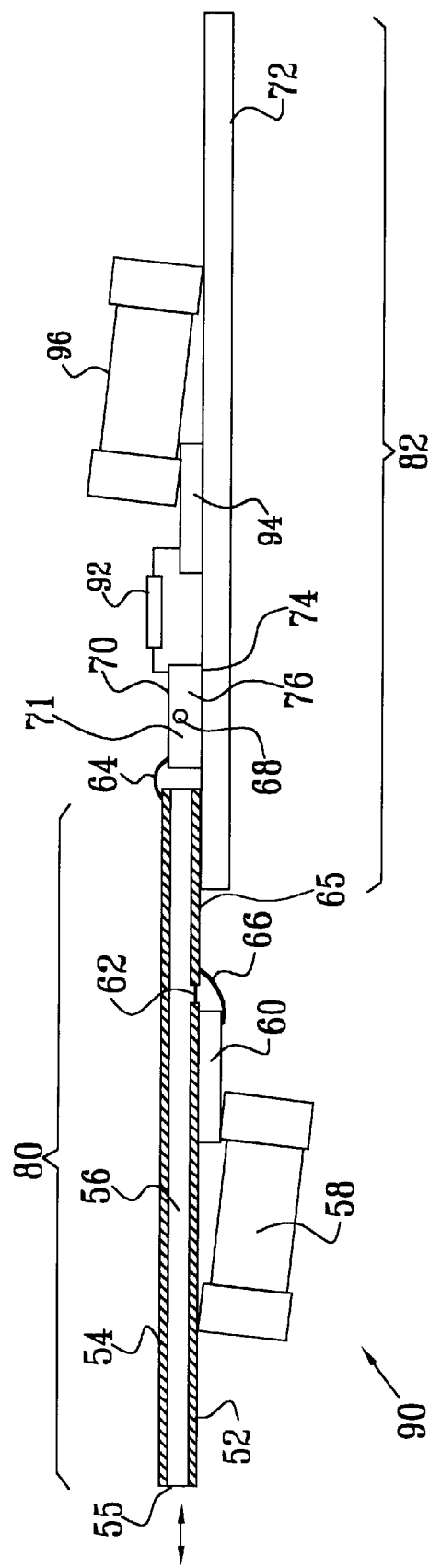
FIG. 3 is a schematic diagram of an alternative assembly for biasing the electro-optical component, according to a preferred embodiment of the present invention.

FIG. 3 is a schematic diagram of an assembly 90 for biasing an electro-optical component, according to an alternative preferred embodiment of the present invention. Apart from the differences described below, the operation of assembly 90 is generally similar to that of assembly 50 (FIG. 2), so that elements indicated by the same reference numerals in both assemblies 50 and 90 are generally identical in construction and in operation. Assembly 90 is preferably used when there is a DC component present on port 55. A first electrode of a capacitor 94, which has a capacitance of the order of 1 nF, is bonded to optical bench 72. Capacitor 94 is typically disk-shaped. A second capacitor 96, typically a surface mounted component having a capacitance of the order of 1 $\mu$F, is connected in parallel with the first capacitor.

A resistor 92, replacing resistor 73 of assembly 50, is connected between a second electrode of capacitor 94 and electrode 70 of component 76. The parallel capacitors act as a capacitor providing a broad-band short-circuit at AC frequencies in a range from approximately 1 kHz to approximately 50 GHz. However, unlike assembly 50, the resistor of assembly 90 is floating and does not provide a DC path to ground. It will be understood that resistor 92 and capacitors 94 and 96 act as circuitry matching an impedance of electro-optical component 76 to transmission line 56. In assembly 50, resistor 73 performs a substantially similar function.

It will be appreciated that assembly 90 may be implemented as sub-assemblies, substantially as described for assembly 50, based on transmission line 56 and optical bench 72.

It will be further appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. An electro-optical assembly, comprising:
   an optical sub-assembly, comprising:
      an electro-optical component comprising an optical region and a first and a second electrode coupled thereto; and
      a conductive optical bench in contact with the second electrode of the electro-optical component, the optical bench being adapted to permit optical alignment of the electro-optical component while making such contact; and
   a transmission line comprising:
      a live conductor;
      a ground conductor insulated from the live conductor; and
      a port adapted to receive a signal, such that the live and ground conductors are coupled to the first and second electrodes of the electro-optical component so as to convey the signal between the port and the electro-optical component and to provide a direct current (DC) bias level to the electro-optical component independent of the signal.

2. An assembly according to claim 1, wherein the conductive optical bench is in direct mechanical and electrical contact with the second electrode.

3. An assembly according to claim 1, wherein the transmission line comprises a micro-strip line which is adapted to operate at frequencies up to approximately 50 GHz.

4. An assembly according to claim 1, wherein the ground conductor comprises a first ground section and a second ground section separated from the first ground section by an insulating gap, and wherein the first and second ground sections are coupled together capacitively, and wherein the first ground section is connected to the conductive optical bench.

5. An assembly according to claim 4, wherein the first and second ground sections are coupled by at least one capacitor so as to form an effective short-circuit between the two sections at alternating current (AC) frequencies in a range from approximately 1 kHz to approximately 50 GHz.

6. An assembly according to claim 5, wherein the transmission line and the at least one capacitor are fabricated as an electrical sub-assembly, and wherein the electro-optical assembly is fabricated by coupling the electrical sub-assembly to the optical sub-assembly.

7. An assembly according to claim 1, wherein the optical bench is adapted to permit the optical alignment after the live and ground conductors of the transmission line are coupled to the first and second electrodes of the electro-optical component.

8. An assembly according to claim 1, and comprising circuitry which matches an impedance of the electro-optical component to the impedance of the transmission line.

9. An assembly according to claim 8, wherein the circuitry comprises a resistor connected between the first electrode and the ground conductor.

10. An assembly according to claim 8, wherein the circuitry comprises a resistor and a capacitor connected in series between the first electrode and the conductive optical bench.

11. An electro-optical assembly, comprising:
    an electro-optical component comprising an optical region and a first and a second electrode coupled thereto;
    a conductive optical bench, in contact with the second electrode of the electro-optical component, the bench being adapted to permit optical alignment of the electro-optical component while making such contact;
    a transmission line comprising a live conductor and a ground conductor insulated from the live conductor, the live conductor being bonded to the first electrode of the electro-optical element, the ground conductor comprising a first ground section and a second ground section electrically connected to the optical bench and insulated from the first ground section by a non-conductive gap therebetween, the second ground section being capacitively coupled to the first ground section.

12. An assembly according to claim 11, wherein the conductive optical bench is in direct mechanical and electrical contact with the second electrode.

13. An assembly according to claim 11, wherein the transmission line comprises a micro-strip line which is adapted to operate at frequencies up to approximately 50 GHz.

14. An assembly according to claim 11, wherein the first and second ground sections are coupled by at least one capacitor so as to form an effective short-circuit between the two sections at alternating current (AC) frequencies in a range from approximately 1 kHz to approximately 50 GHz.

15. An assembly according to claim 11, wherein the optical bench is adapted to permit the optical alignment after the live and ground conductors of the transmission line are coupled to the first and second electrodes of the electro-optical component.

16. An assembly according to claim 11, and comprising circuitry which matches an impedance of the electro-optical component to the impedance of the transmission line.

17. An assembly according to claim 16, wherein the circuitry comprises a resistor connected between the first electrode and the first ground section.

18. An assembly according to claim 16, wherein the circuitry comprises a resistor and a capacitor connected in series between the first electrode and the conductive optical bench.

19. A method for operating an electro-optical assembly, comprising:
    positioning an electro-optical component comprising an optical region and a first and a second electrode coupled thereto, so that the second electrode contacts a conductive optical bench;
    aligning the electro-optical component while maintaining the contact; and
    coupling a transmission line, comprising a live conductor and a ground conductor insulated from the live conductor and a port adapted to receive a signal, to the electro-optical component, such that the live and ground conductors are coupled to the first and second electrodes of the electro-optical component, the transmission line being adapted to convey the signal between the port and the electro-optical component and to enable a direct current (DC) bias level to be applied to the electro-optical component independent of the signal.

20. A method according to claim 19, wherein positioning the electro-optical component comprises placing the component in direct mechanical and electrical contact with the second electrode.

21. A method according to claim 19, wherein the transmission line comprises a micro-strip line which is adapted to operate at frequencies up to approximately 50 GHz.

22. A method according to claim 21, wherein the ground conductor comprises a first ground section and a second ground section separated from the first ground section by an insulating gap, and wherein coupling the transmission line comprises coupling the first and second ground sections capacitively and connecting the first ground section to the conductive optical bench.

23. A method according to claim 22, wherein coupling the first and second ground sections capacitively comprises coupling the first and second ground sections by at least one capacitor so as to form an effective short-circuit between the two sections at alternating current (AC) frequencies in a range from approximately 1 kHz to approximately 50 GHz.

24. A method according to claim 23, and comprising:
    fabricating the transmission line and the at least one capacitor as an electrical sub-assembly;
    fabricating the electro-optical component and the conductive optical bench as an optical sub-assembly; and
    coupling the electrical sub-assembly to the optical sub-assembly to form the electro-optical assembly.

25. A method according to claim 19, wherein aligning the electro-optical component comprises performing an alignment after coupling the transmission line.

26. A method according to claim 19, wherein aligning the electro-optical component comprises adjusting an optical element to be in alignment with the electro-optical component and mechanically coupling the optical element to the conductive optical bench after performing the adjustment.

27. A method according to claim 19, and comprising matching an impedance of the electro-optical component to the impedance of the transmission line.

28. A method according to claim 27, wherein matching the impedance comprises connecting a resistor between the first electrode and the ground conductor.

29. A method according to claim 27, wherein matching the impedance comprises connecting a resistor and a capacitor in series between the first electrode and the conductive optical bench.

30. A method for operating an electro-optical assembly, comprising:

positioning an electro-optical component, having an optical region and a first and a second electrode coupled thereto, on a conductive optical bench so that the second electrode contacts the bench;

aligning the electro-optical component while the second electrode is in contact with the bench;

bonding a live conductor of a transmission line to the first electrode of the electro-optical component;

providing a first ground section of the transmission line for connection to a ground; and connecting a second ground section of the transmission line, which is separated by a non-conductive gap from the first ground section and is capacitively coupled to the first ground section, to the optical bench.

31. A method according to claim 30, wherein positioning the electro-optical component comprises placing the conductive optical bench in direct mechanical and electrical contact with the second electrode.

32. A method according to claim 30, wherein the transmission line comprises a micro-strip line which is adapted to operate at frequencies up to approximately 50 GHz.

33. A method according to claim 30, and comprising coupling the first and second ground sections by at least one capacitor so as to form an effective short-circuit between the two sections at alternating current (AC) frequencies in a range from approximately 1 kHz to approximately 50 GHz.

34. A method according to claim 30, wherein aligning the electro-optical component comprises performing an alignment after bonding the live conductor of the transmission line and connecting the second ground section of the transmission line.

35. A method according to claim 30, wherein aligning the electro-optical component comprises adjusting an optical element to be in alignment with the electro-optical component and mechanically coupling the optical element to the conductive optical bench after performing the adjustment.

36. A method according to claim 30, and comprising matching an impedance of the electro-optical component to the impedance of the transmission line.

37. A method according to claim 36, wherein matching the impedance comprises connecting a resistor between the first electrode and the first ground section.

38. A method according to claim 36, wherein matching the impedance comprises connecting a resistor and a capacitor in series between the first electrode and the conductive optical bench.

* * * * *